(12) United States Patent
Hayashi et al.

(10) Patent No.: US 6,894,859 B2
(45) Date of Patent: May 17, 2005

(54) APPARATUS AND METHOD FOR REPRODUCING INFORMATION, AND STORAGE MEDIUM STORING PROGRAM FOR THE METHOD

(75) Inventors: Kazuhiro Hayashi, Saitama-ken (JP); Takeshi Takahashi, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 335 days.

(21) Appl. No.: 09/987,350

(22) Filed: Nov. 14, 2001

(65) Prior Publication Data

US 2002/0057609 A1 May 16, 2002

(30) Foreign Application Priority Data

Nov. 14, 2000 (JP) ........................................ 2000-347014

(51) Int. Cl.[7] ............................................. G11B 15/18
(52) U.S. Cl. ........................................................ 360/69
(58) Field of Search ................... 360/69; 380/201–203, 380/4, 210, 217, 30; 382/100; 705/57–59, 51, 8, 1, 53, 56; 700/237; 713/194

(56) References Cited

U.S. PATENT DOCUMENTS

| 5,050,031 A | * | 9/1991 | Weiley ........................ 360/137 |
| 5,355,302 A | | 10/1994 | Martin et al. |
| 5,499,221 A | | 3/1996 | Ito et al. |
| 5,715,169 A | * | 2/1998 | Noguchi ..................... 700/237 |
| 5,848,154 A | * | 12/1998 | Nishio et al. ................. 705/51 |

FOREIGN PATENT DOCUMENTS

| EP | 1 030 305 A2 | 8/2000 |
| GB | 2 030 754 A | 4/1980 |

* cited by examiner

*Primary Examiner*—Sinh Tran
*Assistant Examiner*—K. Wong
(74) *Attorney, Agent, or Firm*—Arent Fox, PLLC.

(57) ABSTRACT

An information reproducing apparatus includes totaling means (flash memory) for counting and storing a frequency of reproductions for each data, and control means (CPU) for controlling reproduction based on a sum total calculated by the totaling means. The totaling means performs the following functions: adding a predetermined value to a sum total for a piece of music selected by a user for reproduction; not counting data for reproduction without user's instruction, such as random reproduction, and scan reproduction; adding just a predetermined frequency when the same piece of music is repeatedly reproduced more than the predetermined frequency during a repeat reproduction mode; and subtracting a predetermined value from the sum total for a piece of music targeted for skip during a skip reproduction mode. Thereby, a search operation of the information reproducing apparatus for selecting a desired piece of music from a vast amount of data can be facilitated, and usability thereof can be improved.

20 Claims, 5 Drawing Sheets

FIG.4

| NAME OF MUSIC | FAVORITE DEGREE | REPRODUCTION SEQUENCE |
|---|---|---|
| D | 25 | 1 |
| U | 22 | 2 |
| K | 19 | 3 |
| V | 15 | 4 |
| A | 13 | 5 |
| J | 13 | 6 |
| B | 9 | 7 |

FIG.5

| NAME OF MUSIC | FAVORITE DEGREE | REPRODUCTION SEQUENCE |
|---|---|---|
| B | 9 | 1 |
| J | 13 | 2 |
| A | 13 | 3 |
| V | 15 | 4 |
| K | 19 | 5 |
| U | 22 | 6 |
| D | 25 | 7 |

FIG.6 a

TABLE 1

| NAME OF MUSIC | REGISTRATION DATE | LAST REPRODUCTION DATE | FAVORITE DEGREE |
|---|---|---|---|
| A | 2000.3.1 | 2000.4.1 | 10 |
| B | 2000.4.2 | 2000.5.17 | 7 |
| C | 2000.5.10 | 2000.5.12 | 2 |
| D | 2000.5.17 | – | 0 |

FIG.6 b

TABLE 2

| NAME OF MUSIC | REGISTRATION DATE | LAST REPRODUCTION DATE | FAVORITE DEGREE |
|---|---|---|---|
| A | 2000.3.1 | 2000.5.17 | 6 |
| B | 2000.4.2 | 2000.5.17 | 7 |
| C | 2000.5.10 | 2000.5.12 | 2 |
| D | 2000.5.17 | – | 0 |

APPARATUS AND METHOD FOR REPRODUCING INFORMATION, AND STORAGE MEDIUM STORING PROGRAM FOR THE METHOD

BACKGROUND OF THE INVENTION

The present invention relates to an information reproducing apparatus suitable for reproducing music data stored in a high capacity storage apparatus, a reproducing method and a storage medium which stores a software program for the method.

The present application claims priority from Japanese Application No. 2000-347014, the disclosure of which is incorporated herein by reference for all purposes.

A new market for hard disc drives (HDD) is emerging. Consumer electronics industry and HDD industry have started to become partners and to join together in trying to introduce HDD into not only personal computers but every equipment handling digital data within a home.

In the past few years, because of large increase in capacity and price reduction of HDD, it has become possible to store substantial amount of image data and music contents.

HDD audio devices store music contents into HDD and reproduce the music contents. Data used in these HDD audio devices is compressed according to various formats, and is stored and reproduced. The current typical examples of the compression methods are: MP3 (MPEG1: Moving Picture Experts Group 1, Audio Layer III) and ATRAC3 which is improved from ATRAC (Adaptive Transform Acoustic Coding). Music data for about one minute is equivalent to approximately 1 megabytes.

For example, if HDD has a storage capacity of about 10 gigabytes, 2000 pieces of music can be stored assuming that a playing time of a piece of music is five minutes.

When as much as 2000 pieces of music are stored and read out for reproduction as described above, selection of a piece of music is required. However, since extremely complicated procedures are required for selecting a desired piece of music from a vast number of pieces of music, usage thereof has been very troublesome. Also, it takes much time for the selection, which is a non-negligible problem.

SUMMARY OF THE INVENTION

The present invention has been devised in view of the prior-art problems described above, and an object of the present invention is to provide an information reproducing apparatus wherein, by storing a frequency of reproductions for each piece of music, collecting the frequencies as data indicating user's preference and performing a search operation based on the data, the search operation of a desired piece of music from a vast amount of data is facilitated, load on an operator is reduced, usability thereof is improved, and processing time can be reduced. Also another object of the present invention is to provide a data reproducing method for functioning the apparatus. Still another object of the present invention is to provide a storage medium storing a software program for the method.

In order to resolve the problems described above, an information reproducing apparatus according to a first aspect of the present invention includes totaling means for counting and storing a frequency of reproductions for each information, and control means for controlling reproduction based on a sum total obtained by the totaling means.

As a result of the above structure of an information reproducing apparatus of the present invention, a search operation of desired information from a vast amount of information can be facilitated, and a usability thereof is improved.

According to a second aspect of the present invention, in the information reproducing apparatus according to the first aspect, the totaling means does not count the reproduction in a reproduction mode where the information is reproduced without user's intention (i.e., actual user's instruction), for example, during a random reproduction or scanning reproduction.

As the result, since the sum total is not affected by reproduction information during the reproduction mode without the user's intention, an accurate reproduction control becomes possible.

According to a third aspect of the present invention, in the information reproducing apparatus according to the first aspect, the totaling means counts the reproduction in a repeat reproduction mode by predetermined frequencies when the same information is reproduced repeatedly more than the predetermined frequencies. Accordingly, since a careless increase of the sum total is prevented, the user's preference can be accurately reflected on the sum total.

According to a fourth aspect of the present invention, in the information reproducing apparatus according to the first aspect, the totaling means subtracts a predetermined value from the sum total of a skip target information during a skip reproduction mode.

Thereby, an accurate sum total can be reflected on a search operation by subtracting a predetermined value from the sum total since the selected piece of music during the skip reproduction mode has a high probability that a user does not want to listen to that piece of music.

According to a fifth aspect of the present invention, in the information reproducing apparatus according to the first aspect, the apparatus further comprises updating means for manually updating the sum total mounted on an operation key, wherein the sum total is subtracted or added by a predetermined value.

Accordingly, the sum total can be changed in accordance with the user's preference through the user's intention.

According to a sixth aspect of the present invention, in the information reproducing apparatus according to the first aspect, when a user selects a piece of music for reproduction, the totaling means adds a predetermined value to the sum total for the targeted piece of the music.

As the result, since the targeted piece of music has a high probability that a user want to listen to the piece of music, the user's preference can be accurately reflected on the search operation by increasing the sum total.

According to a seventh aspect of the present invention, in the information reproducing apparatus according to the first aspect, the totaling means updates the sum total when the reproduction of information is completed from the beginning to the end. Thereby, the user's preference can be more accurately reflected on the search operation based on the sum total.

According to an eighth aspect of the present invention, in the information reproducing apparatus according to the first aspect, the totaling means determines whether the sum total should be updated by combining a temporarily stored reproducing status before a stop or pause operation with a status of continued reproduction thereafter when detecting that the stop or pause operation is performed.

As the result, even if the stop or pause operation is performed, the user's preference can be accurately reflected on the sum total.

According to a ninth aspect of the present invention, in the information reproducing apparatus according to the first aspect, the control means includes search means for searching based on the sum total obtained by the totaling means. Thereby, a search operation of desired information from a vast amount of information can be facilitated based on the sum total through the search means, so that the control means for controlling the reproduction of information can be improved.

In order to resolve the problems described above, according to a tenth aspect of the present invention, an information reproducing method for reproducing information comprises a totaling step of counting and storing a frequency of reproductions for each information, and a control step of controlling reproduction based on a sum total obtained by the totaling step.

As a result, a search operation of desired information from a vast amount of information can be facilitated, and a usability thereof can be improved.

According to a eleventh aspect of the present invention, in the information reproducing method according to the tenth aspect, the totaling step includes a step of inhibiting counting information of the reproduction during a reproduction mode without user's instruction.

Accordingly, the counting operation of frequency is not performed during the reproduction without user's instruction such as the random reproduction, the scan reproduction, etc., thereby the reproduction control corresponding to user's preference becomes possible.

According to a twelfth aspect of the present invention, in the information reproducing method according to the tenth aspect, the totaling step includes a step of temporarily storing a status of previous reproduction when a stop or pause operation is detected, and a step of determining whether the sum total should be updated by combining the previously stored status with a status of continued reproduction thereafter.

As the result, even if the stop or pause operation is performed, the user's preference can be accurately reflected on the sum total.

According to a thirteenth aspect of the present invention, in the information reproducing method according to the tenth aspect, the control step comprises a search step of searching based on the sum total produced by the totaling step. Thereby, the search operation of desired information from a vast amount of information can be facilitated based on the sum total through the search step, so that the controlling reproduction of information can be improved.

In order to solve the problems described above, according to a fourteenth aspect of the present invention, there is provided a storing medium having a computer program recorded in order to reproduce information, the computer program comprising the steps of counting a frequency of reproductions performed for each information, storing the frequency of reproductions into storing means, and controlling reproduction by reproducing means based on the frequency of reproductions stored by the storing means.

By executing computer program described above, the search operation of desired information from a vast amount of information can be facilitated, and a usability thereof can be improved.

BRIEF DESCRIPTION OF THE DRAWINGS

The objects and advantages of the present invention will become clear from the following description with reference to the accompanying drawings, wherein:

FIG. 4 is a table showing Example 1 of sorting by a favorite degree according to the present invention;

FIG. 5 is a table showing Example 2 of sorting by the favorite degree according to the present invention;

FIG. 6a is a table showing a data structure of table memory used in the flowchart of FIG. 3; and FIG. 6b is a table showing a data structure where the table memory of FIG. 6a is partially revised.

DETAILED DESCRIPTION OF THE PREFERRED EMBODIMENTS

Figure 1:
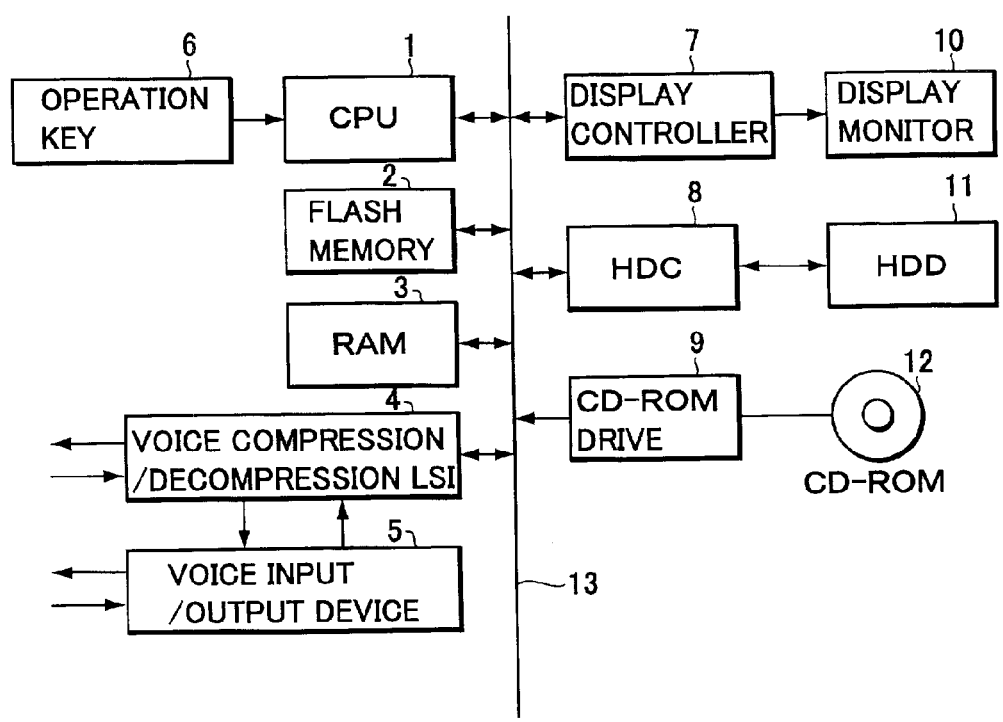
FIG. 1 is a block diagram illustrating an embodiment of an information reproducing apparatus according to the present invention.

FIG. 1 is a block diagram to show an internal structure of an information reproducing apparatus of the present invention.

The information reproducing apparatus of the present invention includes a CPU(central processing unit) 1, a flash memory 2, a RAM 3, a voice compression/decompression LSI(large scale integration) 4, a voice input/output device 5, an operation key 6, a display controller 7, an HDC (hard disc controller) 8, a CD-ROM drive 9, a display monitor 10, an HDD 11 and a CD-ROM 12.

A system bus 13 connects the CPU 1, flash memory 2, RAM 3, voice compression/decompression LSI 4, display controller 7, HDC 8 and CD-ROM drive 9, described above, in common.

In FIG. 1, a music CD is inserted into the CD-ROM drive 9 and music data is read out by a command from the CPU 1. The read out music data is inputted into the voice compression/decompression LSI 4 to be compressed. The compressed music data is stored into the HDD 11 via the HDC 8 as a file. The compressed music data may be not only data inputted from CD but digital audio data which is directly inputted into the voice compression/decompression LSI 4. Also, the compressed data may be audio data converted into digital data from analog audio signal by an integrated A/D converter assembled in the voice input/output device 5.

An audio data file stored in the HDD 11 as described above is read out by a command from the CPU 1 to be supplied to the voice compression/decompression LSI 4 for decompression processing. The data decompressed here is converted into analog signals by a D/A converter assembled in the voice input/output device 5 to be supplied to an amplifier and a speaker which are not shown.

Furthermore, an input operation from the operation key 6 can control a selection of a piece of music to be reproduced or a sequence of reproduction. Entry data of key operation and status data of reproduction of pieces of music stored in the HDD 11 (which piece of music is reproduced, which portion is reproduced, whether or not whole piece is reproduced, etc.) can be written into the flash memory 2 to be stored. The data may be stored in the HDD 11.

Also, status data for music piece reproduction is maintained for each piece of music, and as described later, this status data for music piece reproduction is used as a "favorite degree" which shows user's preference on this piece of music.

The present invention provides means for storing a frequency of reproductions for each piece of music, automatically collecting the frequencies as data showing user's preference (favorite degree), performing search operation based on the favorite degree and making pieces of music having ranking from the highest to the seventh, for example, as a target of reproduction. FIG. 4 shows a sorting example based on the favorite degree in this case. FIG. 4 shows a data structure of a table memory generated by the CPU 1 and assigned to the flash memory 2, entries of which are a name of music, favorite degree and a reproducing sequence. If pieces of music are laid out in a descending order of the favorite degree, favorite pieces of music can be given higher priorities for reproduction.

To the contrary, a reproduction mode, in which pieces of music with lower favorite degree are reproduced, can be considered. In this case, pieces of music, which are not normally heard and are forgotten, can be listened. FIG. 5 shows a sorting example based on the favorite degree of this case. In short, if pieces of music are reproduced in an order of less favorite degree, pieces of music, which are not frequently heard, can be given higher priorities for reproduction.

Figure 2:
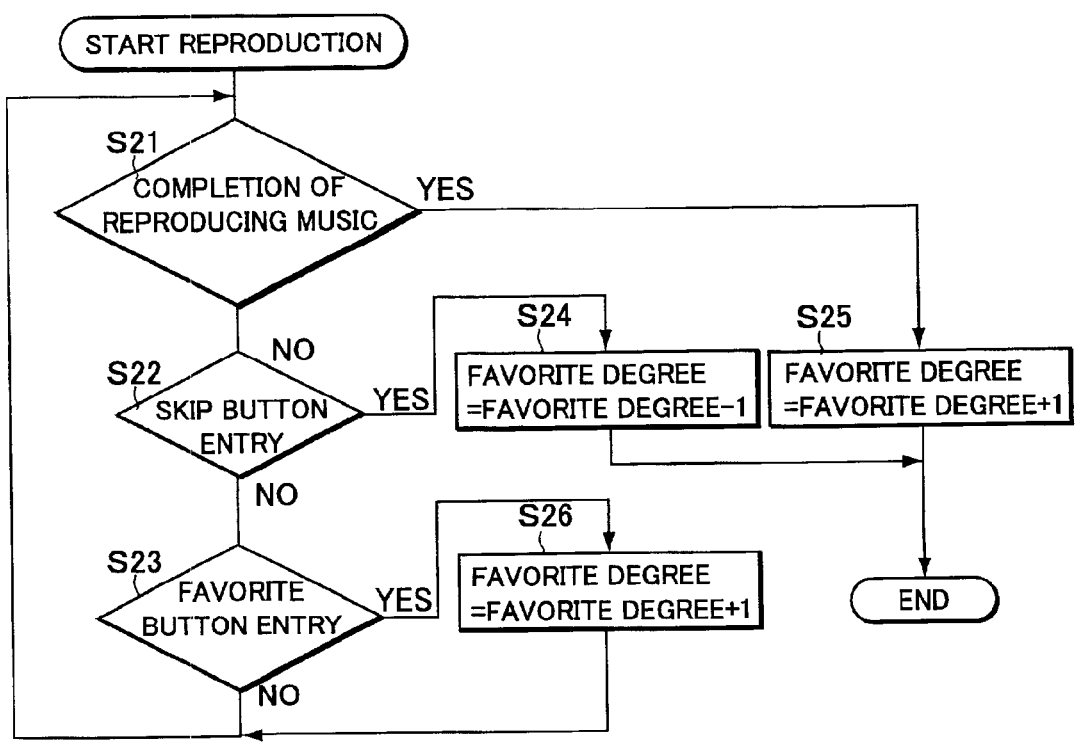
FIG. 2 is a flowchart showing a flow of the information reproducing apparatus according to an embodiment of the present invention.

FIG. 2 shows a flowchart indicating basic process flow for generating "favorite degree" described above. Basically, when reproduction of a piece of music is completed (step S21) after the reproduction is started, a counted value, by a counter, indicating the favorite degree for the corresponding piece of music is updated by +1 (step S25). The Counted value for indicating the favorite degree is assigned in the flash memory 2.

On the other hand, when a skip key is operated (step S22) during reproduction of a piece of music, the counted value described above is updated by −1 (step S24). This action is based on a high probability that a user does not want to listen to the piece of music. Also, by mounting a key for manually increasing the favorite degree on the operation key 6, the CPU 1 updates the counted value indicating the favorite degree of the piece of music being reproduced by +1 (step S26) when this key operation is detected (step S23).

To the contrary, by mounting a key for subtracting the favorite degree on the operation key 6, the counted value indicating the favorite degree of a piece of music being reproduced can be updated by −1 when this key is pressed.

Furthermore, instead of detecting operation of a favorite key, the counted value indicating the favorite degree may be increased when detecting that a user selects a specific piece of music by the other way. That is, in the case of not a random reproduction mode without specifying any specific piece of music nor a reproduction mode with a sequence order following the favorite degree, the counted value of the favorite degree is increased by detecting such an operation that a specific piece of music is specified through specifying a number for a piece of music, or selecting a piece of music from listing of pieces of music displayed on a display monitor. In addition, when such a reproduction of the selected piece of music is completed, the counted value may be increased by a predetermined number, for example, +3 which is greater than +1 used during a normal reproduction mode.

With regard to pieces of music played during the random reproduction mode where all pieces of music stored in HDD or a portion of all the pieces of music are automatically and randomly selected for reproduction, the counted value for indicating the favorite degree is not updated since user's preference for the reproduced pieces of music is not reflected therein.

Further, when performing a scan reproduction mode where only one section, for example, about 10 seconds in the beginning, is reproduced for all or a portion of pieces of music stored in HDD, the counted value for indicating the favorite degree is not updated in the same manner as in the random reproduction described above. The scan reproduction mode is mainly used when a user tries to search pieces of music before entering the normal reproduction mode, therefore there is high probability that user's preference is not reflected on the reproduced pieces of music. Thus, the CPU 1 does not update the counted value in this case also.

When performing a repeat reproduction mode where all or a portion of pieces of music stored in HDD or a piece of music is repeatedly reproduced, the counted value for indicating the favorite degree is updated normally as described above for the first reproduction of the target piece of music, however, the counted value for indicating the favorite degree is not updated for the second reproduction and thereafter. The reason for doing so is to prevent a condition where the favorite degree for pieces of music targeted for the repeat reproduction is far more different from the favorite degree for the other pieces of music as a result of updating the favorite degree every time playing of the pieces of music is repeated.

Also, although the favorite degree is updated only for the first time in the above example, it is possible to arrange so that the favorite degree can be updated until the repetition of 3 times, and are not updated for further playing thereafter. That is, it is possible to change a predefined number of repeat reproduction which allows the favorite degree to be updated.

According to the embodiment described above, the counted value indicating the favorite degree is increased when a piece of music is reproduced from the beginning to the end. However, in the case also that a stop or pause operation is performed during playing of a piece of music, the counted value is updated when reproduction is completed to the end later. In this case, a previous reproduction status is temporarily stored by way of a flag or other means during the stop operation, and a decision of whether or not the updating operation should be performed is made by combining the stored previous status with a status of continued reproduction. Then, the favorite degree data can be more accurately collected by this action.

Figure 3:
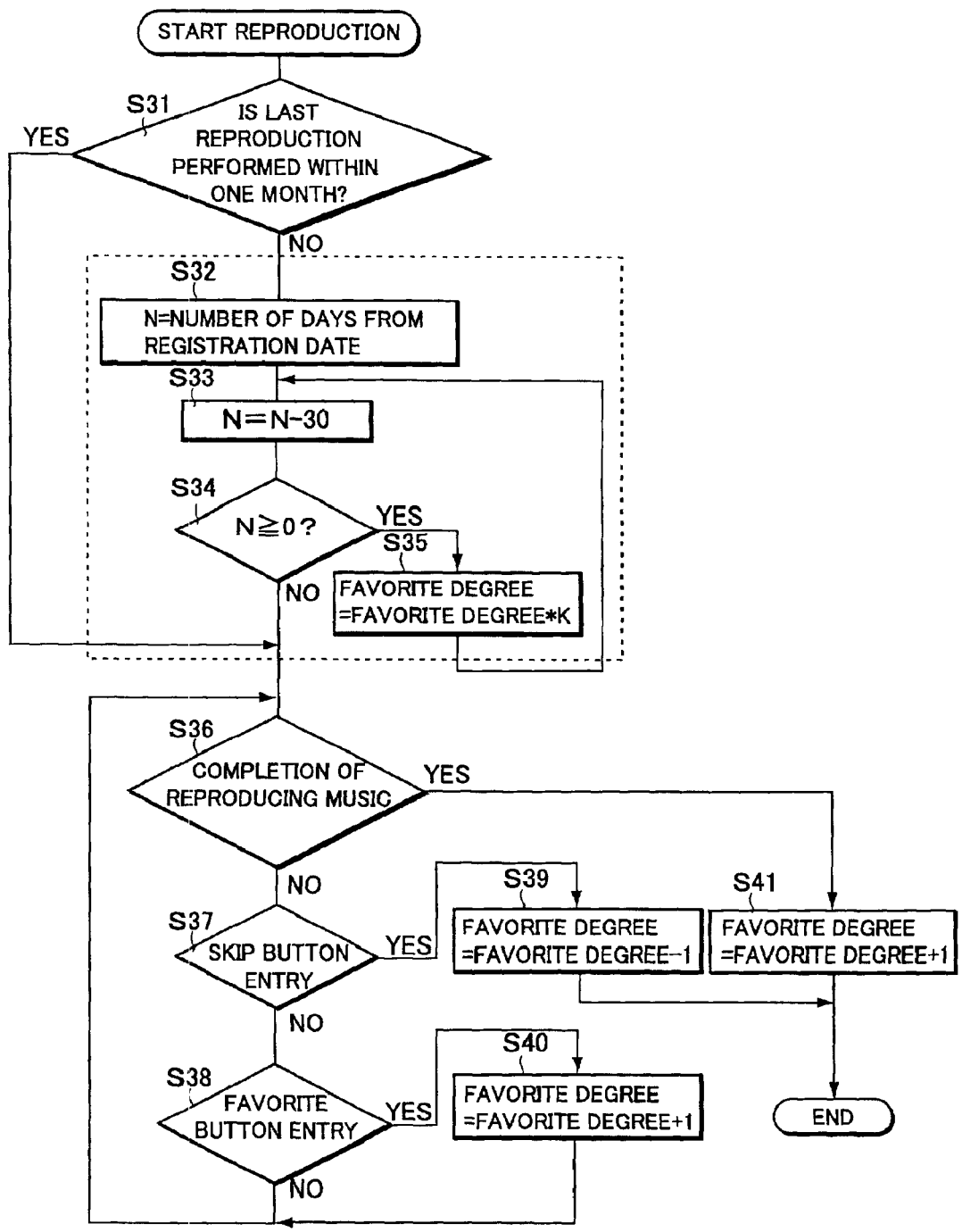
FIG. 3 is a flowchart showing a flow of the information reproducing apparatus according to another embodiment of the present invention.

As the other embodiment of the present invention, FIG. 3 shows a process flow for automatically decreasing the favorite degree as days pass, by giving weighting to the favorite degree, even if reproduction frequencies are high. FIGS. 6a and 6b show an example of the content of table memory used in this case.

Tables 1 and 2 are assigned into the flash memory 2 shown in FIG. 1 and are generated by the CPU 1. The tables 1 and 2 comprises a name of music, a registration date, a last reproduction date, and favorite degree as elements. The table 1 shows data before the favorite degree is changed and the table 2 shows the data after the favorite degree is changed.

Referring to the tables 1 and 2 shown in FIGS. 6a and 6b, a flowchart shown in FIG. 3 will be explained in detail in the following.

First, when the normal reproduction is started, a check is made to determine whether or not the current date and time are within one month of the last reproduction time for a piece of music specified for reproduction (step S31). If the current date and time has passed more than one month from the last reproduction date, a variable N is set to the number of elapsed days from a registration date (step S32), and then the variable N is subtracted by "30" (step S33). Here, the registration date represents a date when a piece of music is memorized into a storing medium such as the HDD, but may be a date when a procedure for enabling the performance is carried out after the piece of music is memorized into the storing medium or the first reproduction date.

Next, the subtracted variable N is checked to determine whether or not it is more than 0 (step S34). If the variable N is less than 0, the process proceeds to a step S36. If the variable N is not less than 0, it is indicated that a period of 30 days has passed since the registration date, and the favorite degree of the registered old piece of music is reduced by multiplying the favorite degree with a coefficient K of less than 1 (step S35). That is, in the step S35, added is a process that the favorite degree is reduced every unit of about one month according to elapsed days from a registration date.

On the other hand, in the step S36, it is checked whether or not reproduction of a piece of music is completed. If the reproduction is completed, the process proceeds to a step S41 to update the favorite degree by +1, and then allows the process to terminate. If the reproduction is not completed, it is further checked whether or not the skip key is operated (step S37). If the skip key is operated, the process proceeds to a step S39 to update the favorite degree by −1, and then allows the process to terminate. If the skip key is not operated, it is further checked whether or not the favorite key is operated (step S38). If the favorite key is operated, the process proceeds to a step S40 to update the favorite degree by +1, and then returns to the step S36. If the favorite key is not operated, the process goes back to the step S36 to check the completion of reproduction of the piece of music. The process following the step S36 is the same as the flowchart as shown in FIG. 2.

In an example of table 1 as shown in FIG. 6a, a period of more than one month has passed from the last reproduction date for the music A if the current date is May 17, 2000 and a piece of music A is only specified for reproduction. Therefore, "5" is obtained by multiplying the favorite degree of 10 with the coefficient of, for example, 0.5 (step S35). Then, after reproduction of the music A is completed, the favorite degree is updated by +1 to obtain "6" as shown in the table 2 of FIG. 6b (step S41).

Here, because the favorite degree does not depend solely on the registration date, a relationship between the favorite degree of relatively old music B which is not reproduced at this time and the favorite degree of the music A reproduced at this time may be reversed as shown in the examples of FIGS. 6a and 6b. However, if hundreds or thousands pieces of music are collected and observed statistically, the favorite degree for pieces of music with old registration dates are relatively lowered, thereby substantially suitable data of the favorite degree can be obtained.

As explained above, the present invention facilitates the search operation of a desired piece of music from a vast amount of data and improves usability thereof by storing the frequency of reproductions for each piece of music, collecting the frequencies as data indicating user's preference and performing the search operation based on the preference data.

The flowcharts shown in FIGS. 2 and 3 are stored as programs in semiconductor memory such as flash memory 2, RAM 3 as shown in FIG. 1. The programs may be stored in an external memory apparatus such as a hard disc drive 11 and be read out to be stored in the semiconductor memory described above as required. Furthermore, the programs may be stored in the semiconductor memory by downloading them through a communication medium such as Internet or the like. Music data may be treated in the same manner as mentioned above.

While there has been described what are at present considered to be preferred embodiments of the present invention, it will be understood that various modifications may be made thereto, and it is intended that the appended claims cover all such modifications as fall within the true spirit and scope of the present invention.

What is claimed is:

1. An information reproducing apparatus for reproducing information, comprising:
   totaling means for counting and storing a frequency of reproductions for each information, wherein each information has a sum total; and
   control means for controlling reproduction based on an order of said sum totals obtained by said totaling means.

2. The information reproducing apparatus according to claim 1, wherein said totaling means does not count the reproduction in a reproduction mode where the information is reproduced without user's instruction.

3. The information reproducing apparatus according to claim 1, wherein said totaling means counts the reproduction in a repeat reproduction mode just by predetermined frequencies when the same information is reproduced repeatedly more than the predetermined frequencies.

4. The information reproducing apparatus according to claim 1, wherein said totaling means subtracts a predetermined value from said sum total of a skip target information during a skip reproduction mode.

5. The information reproducing apparatus according to claim 1, further comprising updating means for manually updating said sum total mounted on an operation key, wherein said sum total is subtracted or added by a predetermined value.

6. The information reproducing apparatus according to claim 1, wherein said totaling means adds a predetermined value to said sum total for a piece of music selected for reproduction by a user.

7. The information reproducing apparatus according to claim 1, wherein said totaling means updates said sum total when the reproduction of information is completed from the beginning to the end.

8. The information reproducing apparatus according to claim 7, wherein said totaling means determines whether said sum total should be updated by combining a temporarily stored reproducing status before a stop or pause operation with a status of continued reproduction thereafter when detecting that the stop or pause operation is performed.

9. A method for reproducing information, comprising:
   a totaling step for counting and storing a frequency of reproductions for each information, wherein each information has a sum total; and
   a control step for controlling reproduction based on an order of said sum totals produced by the totaling step.

10. The information reproducing method according to claim 9, wherein said totaling step includes a step of inhibiting counting information of the reproduction during a reproduction mode without user's instruction.

11. The information reproducing method according to claim 9, wherein said totaling step comprising:
   a step of temporarily storing a status of previous reproduction when a stop or pause operation is detected; and
   a step of determining whether said sum total should be updated by combining the previously stored status with a status of continued reproduction thereafter.

12. A computer program recorded on a medium in order to reproduce information recorded on the medium, the computer program comprising instructions for:

counting a frequency of reproductions performed for each information;

storing the frequency of reproductions for each information into storing means; and controlling reproduction by reproducing means based on an order of the frequency of reproductions stored by the storing means.

13. An information reproducing apparatus for reproducing information, comprising:

a totaling counter counting and storing a frequency of reproductions for each information, wherein each information has a sum total; and a controller for controlling reproduction based on an order of said sum totals obtained by said totaling counter.

14. The information reproducing apparatus according to claim 13, wherein said totaling counter does not count the reproduction in a reproduction mode where the information is reproduced without user's instruction.

15. The information reproducing apparatus according to claim 13, wherein said totaling counter counts the reproduction in a repeat reproduction mode just by predetermined frequencies when the same information is reproduced repeatedly more than the predetermined frequencies.

16. The information reproducing apparatus according to claim 13, wherein said totaling counter subtracts a predetermined value from said sum total of a skip target information during a skip reproduction mode.

17. The information reproducing apparatus according to claim 13, further comprising an updating key for manually updating said sum total mounted on an operation key, wherein said sum total is subtracted or added by a predetermined value.

18. The information reproducing apparatus according to claim 13, wherein said totaling counter adds a predetermined value to said sum total for a piece of music selected for reproduction by a user.

19. The information reproducing apparatus according to claim 13, wherein said totaling counter updates said sum total when the reproduction of information is completed from the beginning to the end.

20. The information reproducing apparatus according to claim 19, wherein said totaling counter determines whether said sum total should be updated by combining a temporarily stored reproducing status before a stop or pause operation with a status of continued reproduction thereafter when detecting that the stop or pause operation is performed.

* * * * *